E. A. BASEL.
AUTO POWER TRANSMISSION ATTACHMENT.
APPLICATION FILED JUNE 12, 1916.
1,316,530.
Patented Sept. 16, 1919.
3 SHEETS—SHEET 1.
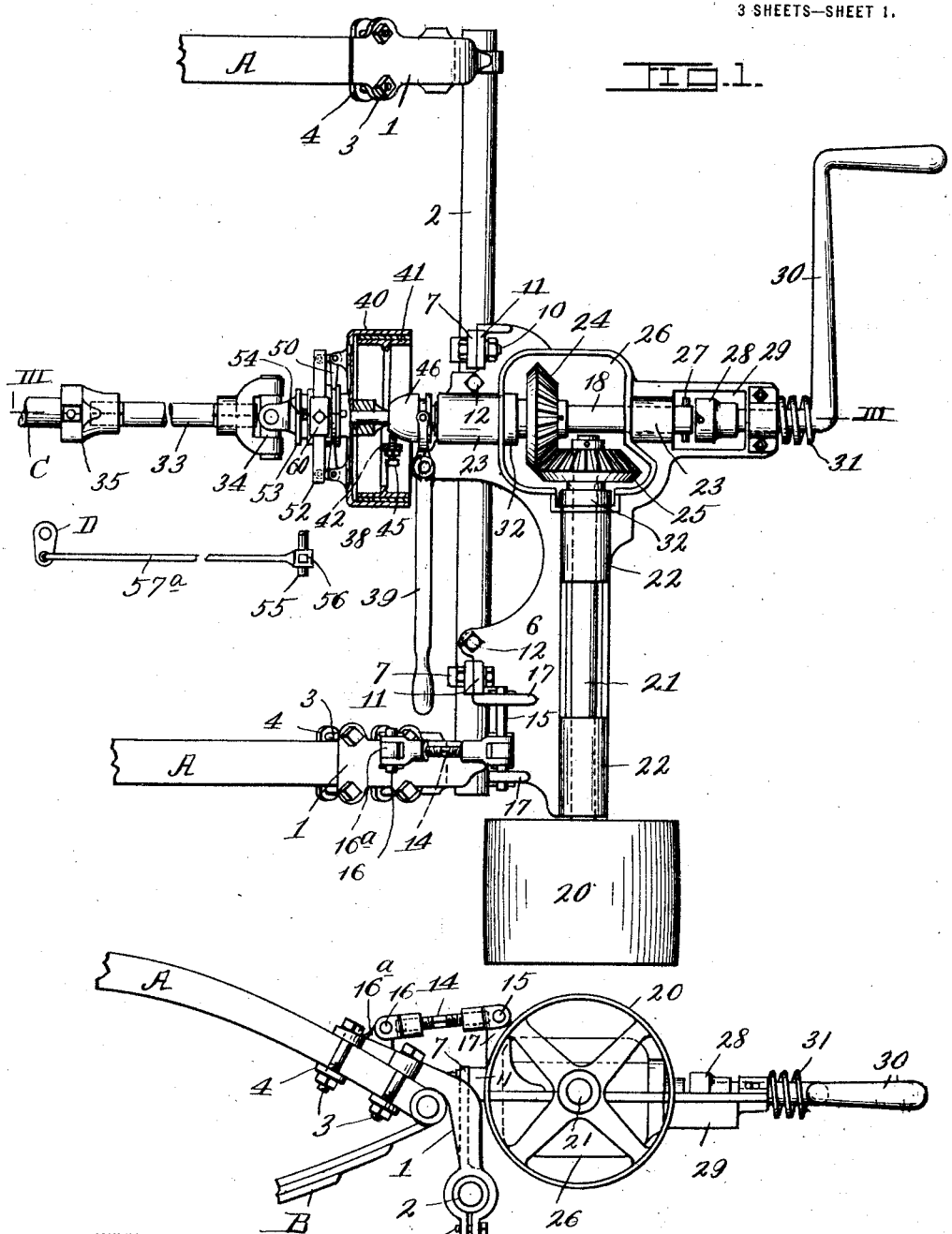
WITNESS:
R. Hamilton
L. J. Fischer
INVENTOR:
Eli A. Basel,
BY
F. G. Fischer
ATTORNEY.

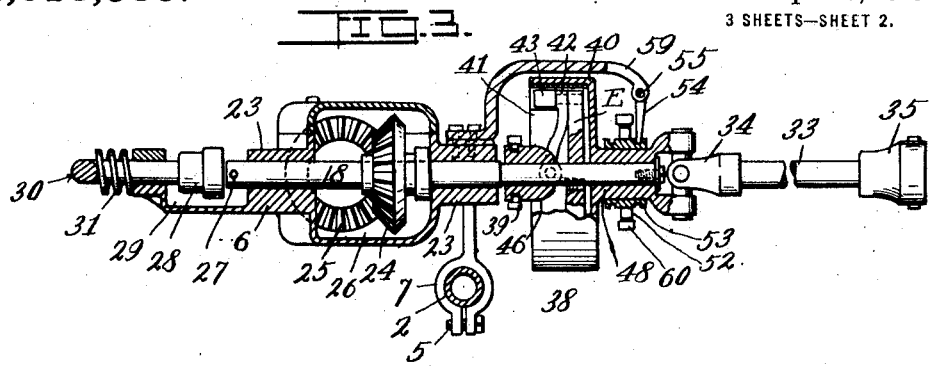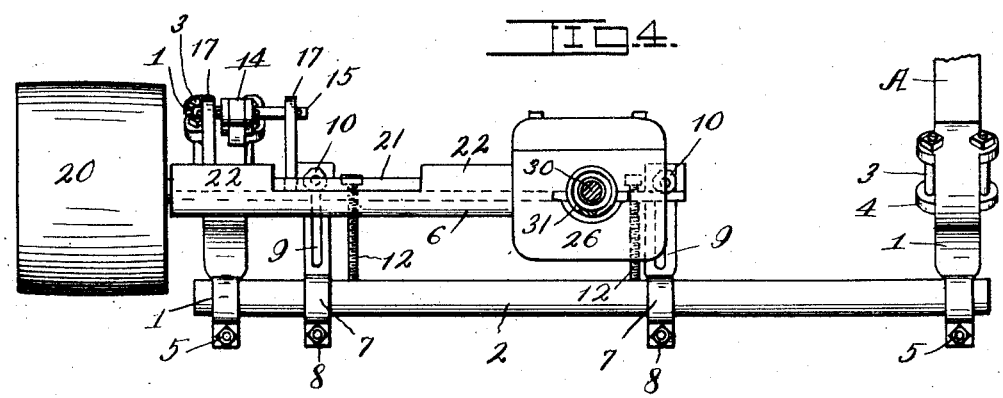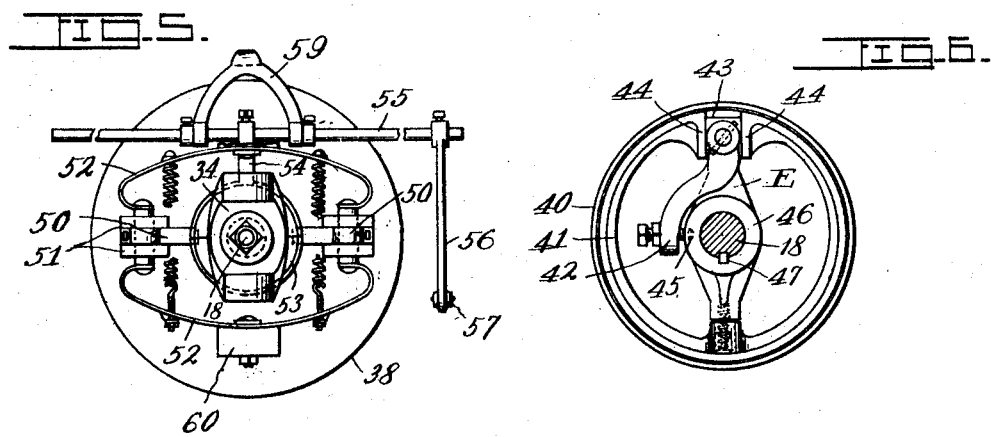

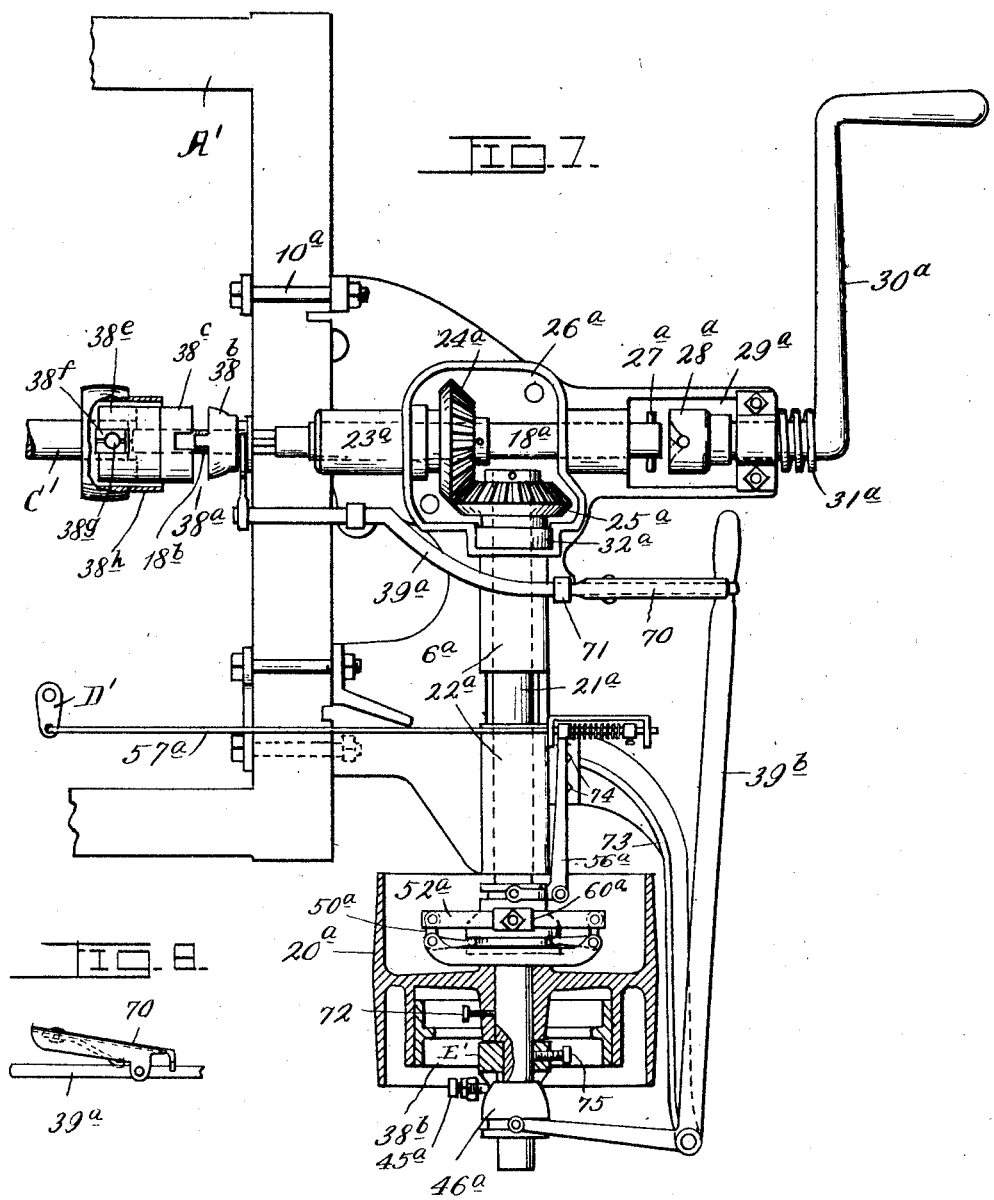

UNITED STATES PATENT OFFICE.

ELI A. BASEL, OF KANSAS CITY, MISSOURI.

AUTO POWER-TRANSMISSION ATTACHMENT.

1,316,530.  Specification of Letters Patent.  Patented Sept. 16, 1919.

Application filed June 12, 1916. Serial No. 103,152.

*To all whom it may concern:*

Be it known that I, ELI A. BASEL, a citizen of the United States, residing at Kansas City, in the county of Jackson and State of Missouri, have invented certain new and useful Improvements in Auto Power-Transmission Attachments, of which the following is a specification.

My invention relates to power attachments for motor cars, and one object is to provide an attachment of this character whereby the power of the car motor may be utilized for purposes other than the propulsion of the car.

A further object is to provide an attachment which can be quickly applied to the car for use and readily removed after such use, or if desired it may be left on the car without interfering with the ordinary use of the latter.

A further object is to provide automatic means for controlling the speed of the motor, so that it will respond to variations in the load and whereby it is prevented from speeding when the load is thrown off.

A further object is to provide an attachment which, in its preferred form, can be installed on any standard car and in its modified form is especially adapted to Ford cars.

Other objects of the invention will hereinafter appear, and in order that said invention may be fully understood, reference will now be made to the accompanying drawings, in which:

Figure 1 is a broken plan view, partly in section, of my preferred form of power attachment applied to the front end of an automobile.

Fig. 2 is a side elevation with some of the parts removed.

Fig. 3 is a longitudinal section on line III—III of Fig. 1.

Fig. 4 is a front elevation with some of the parts removed.

Fig. 5 is a rear elevation of a clutch and a throttle governor employed in carrying out the invention.

Fig. 6 is a front elevation of the clutch.

Fig. 7 is a plan view of a modified form of the invention, adapted to a Ford car.

Fig. 8 is a broken detail of a shift lever and a latch for holding said shift lever in either of its extreme positions.

Fig. 9 is a detail of a self-alining clutch employed in carrying out the invention.

Referring now in detail to the various parts, A designates the front end of the automobile chassis to which the front springs B are connected in the usual manner, and C designates the motor shaft, all of which are of usual form.

In carrying out my invention, I employ removable supporting means consisting of a pair of hangers 1 and a transverse bar 2. The hangers 1 are secured to the front end of the chassis A by bolts 3 and plates 4, and the bar 2 is firmly clamped in the split lower ends of the hangers 1 by screws 5.

6 designates a housing carrying the major portion of my attachment. Said housing is removably and adjustably secured to the bar 2 through the intermediacy of a pair of arms 7, the split lower ends of which are made to firmly grip the bar 2 by screws 8. The arms 7 have longitudinal slots 9 for passage of bolts 10, which extend through lugs 11 on the rear portion of the housing and firmly but adjustably secure said housing to the arms 7. Screws 12 threaded through the housing 6 and bearing upon the bar 2 are employed to obtain exact vertical adjustment of the housing 6, whereupon the same is firmly locked in place by the bolts 10.

The arms 7 are assisted in supporting the housing 6 by a turn-buckle 14 pivoted at one end to a pin 15 and at its opposite end to a pin 16 extending through a lug 16$^a$ integral with the adjacent hanger 1. The pin 15 is mounted in the upper ends of two lugs 17 extending upwardly from the housing 6, and is longer than the width of the turn-buckle 14 to permit the latter to slide thereon and thus allow the hangers 1 to be adjusted apart or toward each other upon the bar 2 to fit chassis of different widths. In addition to the turn-buckle 14 aiding the arms 7 in supporting the housing 6, it also provides means whereby said housing may be rocked slightly about the axis of the bar 2 to adjust a shaft 18, carried by said housing, in axial alinement with the motor shaft C.

As disclosed by Fig. 1, the turn-buckle 14 is placed adjacent to that end of the housing 6 subjected to the greatest strain, *i. e.* the end adjacent a drive pulley 20 fixed upon one end of a shaft 21, journaled in bearings 22 on the housing and arranged at an angle to the shaft 18 which is journaled in bearings 23 on the housing 6. Shaft 18 is arranged to drive the shaft 21 through the intermediacy of bevel gear wheels 24 and 25, fixedly-mounted upon the shafts 18 and 21, respectively, and arranged in a lubricant chamber 26 in the housing. Ball thrust bearings 32 are interposed between the hubs of the bevel gear wheels and the adjacent bearings 22 and 23, as disclosed by Fig. 1.

The forward end of the shaft 18 is provided with a transverse pin 27 for engagement with a notched socket 28, arranged in a chamber 29 in the housing 6 and mounted upon a hand crank 30, whereby the motor may be cranked in the usual manner. A spring 31 interposed between the forward end of the chamber 29 and the bent portion of the hand crank 30 tends to force the same outwardly and thus normally hold the socket 28 out of engagement with the pin 27. The hand crank 30 and the spring 31 may be those originally furnished with the automobile.

The shaft 18 extends rearwardly and is connected to an intermediate shaft 33 by means of a universal joint 34. Said intermediate shaft 33 is removably-connected at its rear end to the motor shaft C by a universal coupling 35. The intermediate shaft 33 is rectangular at its ends to fit into corresponding openings in the universal joints 34 and 35, which have longitudinal movement upon said shaft to compensate for slight variations in the distance between the forward end of the motor shaft C and the rear end of the shaft 18. The intermediate shaft 33 and the members 34 and 35 prevent binding of the motor shaft C and the shaft 18, should they get out of axial alinement with each other.

In order that the shaft 18 may be thrown in and out of gear with the intermediate shaft 33 while the same is rotating with the motor shaft C, I provide a clutch 38 and a shift lever 39. Said clutch 38 may be any well-known type comprising an external member 40 and an internal expansible member 41, the resiliency of which tends to throw it out of engagement with the external member 40. A lever 42 fixed to a rockable block 43 interposed between the ends 44 of the internal member 41, is employed to expand said internal member and cause it to frictionally engage the external member 40. The free end of the lever 42 has a set-screw 45 adapted to be engaged by the conical end of a sleeve 46, having a feather connection 47 with the shaft 18, whereby it is rotated by said shaft and at the same time is free to be slid thereon by the shifting lever 39 for the purpose of controlling the lever 42. The closed end of the external clutch member 40 has a hub 48 loosely-mounted upon the shaft 18 and formed integrally with the universal joint 34, as disclosed by Fig. 3. The block 43 is pivotally-connected to an arm E fixedly-mounted upon the shaft 18.

As it is desirable to have the motor respond to the variations in the load upon the pulley 20 and also to prevent said motor from racing when the clutch members 40 and 41 are disengaged, I provide a throttle governor which may be of any well known type and in the present instance embodies a pair of bell-cranks 50, pivotally mounted between lugs 51 on the back of the external clutch member 40.

One terminal of each bell-crank 50 is pivotally-connected to the adjacent ends of a pair of bow springs 52, while the opposite end of each bell-crank projects into one of the peripheral grooves of a split sleeve 53 slidably mounted upon the clutch hub 48. The other groove is entered by a finger 54 fixed to a rock-shaft 55, having an adjustably-mounted crank 56 provided at its lower end with a connecting rod 57 leading back to the throttle lever D of the motor. As disclosed by Figs. 3 and 5, the rock-shaft 55 is mounted in a bracket 59 secured upon the rearmost bearing 23. The bow springs 52 are provided with weights 60, which are thrown outward more or less by centrifugal force and cause the ends of the springs 52 to draw inward and actuate the throttle lever D through the intermediacy of the intervening parts.

Briefly, the operation is as follows: If the motor is not provided with a self-starter it is manually started with the crank 30 after the clutch 38 has been thrown in gear with the lever 39. After the motor has been started it drives the pulley 20 through the intermediacy of the intervening gearing and after the proper speed has been attained it is automatically retained at approximately such speed through the intermediacy of the governor and its connection with the throttle. If desired the pulley 20 can be stopped while the motor is running by throwing the clutch 38 out of gear through the intermediacy of the shift lever 39. The presence of the universal joints 34 and 35 permits the shafts 18 and 33 to operate without binding should they get slightly out of axial alinement with each other or with the motor shaft. When the automobile is to be used on the road my entire apparatus can be removed by simply taking out the bolts 3 and disconnecting the coupling 35 from the motor shaft, and since it is self-contained the assembly of the various parts need not be disturbed by such removal. Hence, it can be again quickly applied to the automobile when desired. However, if it is preferable not to disturb the hangers 1, the balance of the device can be removed after loosening the bolts 5 and 8, and removing the pin 16.

In the modified form which is particularly adapted to a Ford car, the parts similar to the preferred form bear corresponding reference numerals with exponents, and hence it is deemed unnecessary to repeat the description thereof and reference will only be made to the parts differing from the preferred form. As shown the housing 6ª is secured directly to the front cross bar of the chassis A' by bolts 10ª. A modified form of self-alining clutch member 38ª is interposed between the shaft 18ª and the motor shaft C'. Said clutch member 38ª, embodies a shiftable member 38ᵇ, and two self-alining members 38ᶜ and 38ᵉ, respectively. The member 38ª is slidably mounted upon the rectangular portion 18ᵇ of the shaft 18ª, while the member 38ᶜ is free to rotate upon the cylindrical terminal of said shaft 18ª when out of gear with the shiftable member 38ᵇ. The member 38ᵉ is mounted loosely upon the motor shaft C', but caused to rotate through the intermediacy of block 38ᶠ and a pin 38ᵍ, which latter extends through the shaft C'. The members are surrounded by a grease retainer 38ʰ, which also retains the blocks 38ᶠ in position. The clutch member 38ᵇ is controlled by a lever 39ª having a latch 70 adapted to engage opposite sides of a guide 71 and thus secure the lever 39ª either forward or backward and reliably hold the clutch 38ª either forward or backward and reliably hold the clutch 38ª in or out of gear. The governor 52ª is arranged within the pulley 20ª for the sake of compactness. The pulley 20ª may be loose upon the shaft 21ª or fixed thereon by a set-screw 72 if desired. When the set screw 72 is not employed the pulley 20ª may be locked upon the shaft when desired by a clutch 38ᵇ somewhat similar to the clutch 38 and controlled by a bell-crank 39ᵇ, fulcrumed upon a bracket 73, secured to a lug on the adjacent bearing 22ª by bolts 74. When the automobile is to be used on the road it may be relieved of the weight of the pulley 20ª and adjacent parts by removing the same after loosening the set screws 72, 75 and removing the bolts 74.

Having thus described my invention, what I claim and desire to secure by Letters Patent, is:

1. In an attachment of the character described, means adapted to be supported at the forward end of an automobile, shafts geared together and journaled in said means at an angle to each other, intermediate means for driving one of said shafts from the automobile motor, power transmitting means mounted on the other shaft, and a governor driven by the intermediate means and connected to the motor to regulate the speed thereof.

2. In an attachment of the character described, means adapted to be attached to the forward portion of an automobile, shafts geared together and journaled in said means at an angle to each other, means for driving one of said shafts from the automobile motor, a pulley mounted on the other shaft, a governor driven by the shaft driving means, and a clutch interposed between said governor and the gearing interposed between the two shafts.

3. In an attachment of the character described, a support adapted to be attached to the forward portion of an automobile, two shafts journaled in said support, bevel gears whereby one of said shafts is driven by the other shaft, flexible means connecting the drive shaft and the motor shaft of the automobile, and a governor driven by said flexible means and connected to the motor throttle to regulate the speed of said motor.

4. In an attachment of the character described, a housing adapted to be supported at the forward end of an automobile, shafts geared together and journaled in said housing at an angle to each other, flexible intermediate means for driving one of said shafts from the automobile motor, power transmitting means mounted on the other shaft, manual means for cranking the first shaft, and a governor driven by the intermediate means and connected to the motor to regulate the speed thereof.

5. In an attachment of the character described, hangers adapted to be secured to the front portion of an automobile, a transverse member uniting said hangers, slotted arms secured to said transverse member, a housing adjustably secured to said slotted arms, means connecting said housing and one of the hangers for adjusting said housing and the arms about the axis of the transverse member, and means mounted in the housing and adapted to transmit power from the automobile motor.

6. An automobile power attachment comprising supporting means adapted to be detachably secured to the front portion of the automobile, a pair of shafts journaled in said supporting means and geared together at an angle to each other, means for driving one of said shafts from the automobile motor, and adjusting means for shifting the location of said shafts with relation to the shaft of said motor.

7. An automobile power attachment comprising supporting means adapted to be detachably secured to the front portion of the automobile, a pair of shafts journaled in said supporting means and geared together at an angle to each other, means for driving one of said shafts from the automobile motor, and means for adjusting the position of said shafts about an axis extending at right angles to the shaft of said motor.

8. An automobile power attachment comprising supporting means adapted to be detachably secured to the front portion of the automobile, a pair of shafts journaled in said supporting means and geared together at an angle to each other, and means for driving one of said shafts from the automobile motor, said supporting means being provided with means for effecting vertical adjustment of said shafts.

9. An automobile power attachment comprising supporting means adapted to be detachably secured to the front portion of the automobile, a pair of shafts journaled in said supporting means and geared together at an angle to each other, means for effecting vertical adjustment of the position of said shafts, and means for rocking said shafts in unison about a transverse axis extending at right angles to the shaft of said motor.

10. An automobile power attachment comprising supporting means adapted to be detachably secured to the front portion of the automobile, said supporting means including a transversely extending member, a bearing frame provided with supporting elements for mounting said bearing frame on said transverse member, said supporting elements being adjustable transversely along said transverse member, and power transmission means carried by said bearing frame and including a shaft adapted to be alined and coupled with the shaft of the automobile motor.

In testimony whereof I affix my signature, in the presence of two witnesses.

ELI A. BASEL.

Witnesses:
F. G. FISCHER,
L. J. FISCHER.

Copies of this patent may be obtained for five cents each, by addressing the "Commissioner of Patents, Washington, D. C."